US010589690B2

(12) United States Patent
Torres Davalos et al.

(10) Patent No.: US 10,589,690 B2
(45) Date of Patent: Mar. 17, 2020

(54) CARGO BIN SYSTEM WITH "T" BRACKET FASTENER

(71) Applicant: GM GLOBAL TECHNOLOGY OPERATIONS LLC, Detroit, MI (US)

(72) Inventors: Uriel Torres Davalos, Independencia (MX); Pamela Flores Marin, Mexico (MX); Lennin Fitz Roman, Nezahualcoyotl (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 15/972,504

(22) Filed: May 7, 2018

(65) Prior Publication Data

US 2019/0337458 A1 Nov. 7, 2019

(51) Int. Cl.
*B60R 7/04* (2006.01)
*B60R 11/00* (2006.01)

(52) U.S. Cl.
CPC ....... *B60R 7/043* (2013.01); *B60R 2011/0015* (2013.01); *B60R 2011/0029* (2013.01); *B60R 2011/0061* (2013.01)

(58) Field of Classification Search
CPC ... B60R 9/02; B60R 7/043; B60R 2011/0094; B60R 7/02
See application file for complete search history.

(56) References Cited

U.S. PATENT DOCUMENTS

| | | | | |
|---|---|---|---|---|
| 6,488,327 | B1* | 12/2002 | Pearse | B60N 2/2863 296/37.15 |
| 6,508,499 | B1* | 1/2003 | Guanzon | B60R 5/04 296/37.1 |
| 6,695,380 | B1* | 2/2004 | Hicks | B60R 5/04 296/37.14 |
| 7,651,146 | B2* | 1/2010 | Anderson | B60R 7/02 296/37.6 |
| 9,340,162 | B2* | 5/2016 | Line | B60R 7/043 |
| 9,937,869 | B2* | 4/2018 | Hemphill | B60P 7/08 |
| 10,065,564 | B2* | 9/2018 | Romero Contreras | B60R 7/02 |
| 10,336,262 | B2* | 7/2019 | Mozurkewich | B60N 2/42763 |
| 2006/0290157 | A1* | 12/2006 | Bohlke | B60R 5/04 296/37.6 |
| 2007/0207000 | A1* | 9/2007 | Bohlke | B60R 5/04 410/94 |
| 2008/0272630 | A1* | 11/2008 | Sturt | B60N 2/64 297/188.07 |

(Continued)

*Primary Examiner* — Bradley Duckworth
(74) *Attorney, Agent, or Firm* — Lorenz & Kopf, LLP

(57) ABSTRACT

In one exemplary embodiment, a seating system for a vehicle includes an occupant seat, a bin housing, and a bracket panel. The bin housing forms a cavity in which items may be stored beneath the occupant seat, and includes a bin surface forming a recess having a first section and a second section. The bracket panel is coupled between the occupant seat and the bin housing, and includes an installation plate having a panel surface, and a "T" shaped bracket that extends from the panel surface and is configured to be inserted into the first section and the second section of the recess during installation. The "T" shaped bracket includes: a first component configured to be received by the second section of the recess during installation; and a second component configured to be received by the first section of the recess during installation.

12 Claims, 8 Drawing Sheets

(56) References Cited

U.S. PATENT DOCUMENTS

2015/0375686 A1* 12/2015 George ................. B60P 1/44
                                                                                            248/201
2019/0275949 A1* 9/2019 Kubota ................. B60R 7/043

* cited by examiner

CARGO BIN SYSTEM WITH "T" BRACKET FASTENER

TECHNICAL FIELD

The technical field generally relates to the field of vehicles and, more specifically, to cargo bins systems for occupant seats for vehicles.

INTRODUCTION

Many vehicles include occupant seats having cargo bins. With certain types of vehicles, it may be desirable to provide different mechanisms for installation of cargo bins for the occupant seats.

Accordingly, it is desirable to provide cargo bin systems for occupant seats for vehicles, for example that can be easily installed in an effective manner. Furthermore, other desirable features and characteristics of the present invention will become apparent from the subsequent detailed description and the appended claims, taken in conjunction with the accompanying drawings.

SUMMARY

In one exemplary embodiment, a cargo bin system for a vehicle includes a bin housing and a bracket panel. The bin housing forms a cavity in which items may be stored. The bin housing includes a bin surface forming a recess having a first section and a second section. The bracket panel includes an installation plate and a "T" shaped bracket. The installation plate has a panel surface. The "T" shaped bracket extends from the panel surface. The "T" shaped bracket includes: a first component configured to be received by the second section of the recess during installation; and a second component configured to be received by the first section of the recess during installation.

Also in one exemplary embodiment, the first component of the "T" shaped bracket, the second component of the "T" shaped bracket, the first section of the recess, and the second section of the recess are each at least substantially rectangular in shape, with each having respective opposing larger sides and respective opposing smaller sides.

Also in one exemplary embodiment, the first component extends, parallel to the panel surface, from an end of the first component that is opposite the panel surface; the first section of the recess is configured with its respective larger sides extending in a first direction; and the second section of the recess is configured with its respective larger sides extending in a second direction that is perpendicular to the first direction.

Also in one exemplary embodiment, the first component of the "T" shaped bracket is configured to be received by the second section of the recess during a first installation step, in which the "T" shaped bracket is moved in a first direction toward the bin surface; and the second component of the "T" shaped bracket is configured to be received by the first section of the recess during a second installation step, subsequent to the first installation step, in which the "T" shaped bracket is moved in a second direction along the bin surface.

Also in one exemplary embodiment, the "T" shaped bracket is configured to be snapped into place within the recess during the second installation step.

Also in one exemplary embodiment, the "T" shaped bracket panel further includes a second protrusion extending from the panel surface; and the bin surface further forms a mating region configured to receive the second protrusion during installation.

Also in one exemplary embodiment, the bracket panel further includes a mounting plate that is configured to be attached to the installation plate and mounted to an occupant seat of a vehicle.

Also in one exemplary embodiment, the vehicle includes an automotive vehicle.

In another exemplary embodiment, a seating system for a vehicle includes an occupant seat, a bin housing, and a bracket panel. The bin housing forms a cavity in which items may be stored beneath the occupant seat, and includes a bin surface forming a recess having a first section and a second section. The bracket panel is coupled between the occupant seat and the bin housing, and includes an installation plate and a "T" shaped bracket. The installation plate has a panel surface. The "T" shaped bracket extends from the panel surface, and is configured to be inserted into the first section and the second section of the recess during installation. The "T" shaped bracket includes: a first component configured to be received by the second section of the recess during installation; and a second component configured to be received by the first section of the recess during installation.

Also in an exemplary embodiment, the first component extends, parallel to the panel surface, from an end of the first component that is opposite the panel surface; the first section of the recess is configured with its respective larger sides extending in a first direction; and the second section of the recess is configured with its respective larger sides extending in a second direction that is perpendicular to the first direction.

Also in an exemplary embodiment, the first component of the "T" shaped bracket is configured to be received by the second section of the recess during a first installation step, in which the "T" shaped bracket is moved in a first direction toward the bin surface; and the second component of the "T" shaped bracket is configured to be received by the first section of the recess during a second installation step, subsequent to the first installation step, in which the "T" shaped bracket is moved in a second direction along the bin surface.

Also in an exemplary embodiment, the first component of the "T" shaped bracket, the second component of the "T" shaped bracket, the first section of the recess, and the second section of the recess are each at least substantially rectangular in shape, with each having respective opposing larger sides and respective opposing smaller sides.

Also in an exemplary embodiment, the "T" shaped bracket is configured to be snapped into place within the recess during the second installation step.

Also in an exemplary embodiment, the "T" shaped bracket panel further includes a second protrusion extending from the panel surface; and the bin surface further forms a mating region configured to receive the second protrusion during installation.

Also in an exemplary embodiment, the bracket panel further includes a mounting plate that is configured to be attached to the installation plate and mounted to the occupant seat of the vehicle.

Also in an exemplary embodiment, the vehicle includes an automotive vehicle.

In another exemplary embodiment, a vehicle includes a body, a propulsion system, and a seating system. The propulsion system is configured to move the body. The seating system is disposed within the body, and includes an occupant seat, a bin housing, and a bracket panel. The bin housing forms a cavity in which items may be stored beneath the occupant seat, and includes a bin surface forming a recess having a first section and a second section. The bracket panel is coupled between the occupant seat and the bin housing, and includes an installation plate and a "T" shaped bracket. The installation plate has a panel surface. The "T" shaped bracket extends from the panel surface. The "T" shaped bracket is configured to be inserted into the first section and the second section of the recess during installation. The "T" shaped bracket includes: a first component configured to be received by the second section of the recess during installation; and a second component configured to be received by the first section of the recess during installation.

Also in one embodiment, the first component of the "T" shaped bracket is configured to be received by the second section of the recess during a first installation step, in which the "T" shaped bracket is moved in a first direction toward the bin surface; and the second component of the "T" shaped bracket is configured to be received by the first section of the recess during a second installation step, subsequent to the first installation step, in which the "T" shaped bracket is moved in a second direction along the bin surface.

Also in one embodiment, the "T" shaped bracket is configured to be snapped into place within the recess during the second installation step.

Also in one embodiment, the vehicle includes an automotive vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
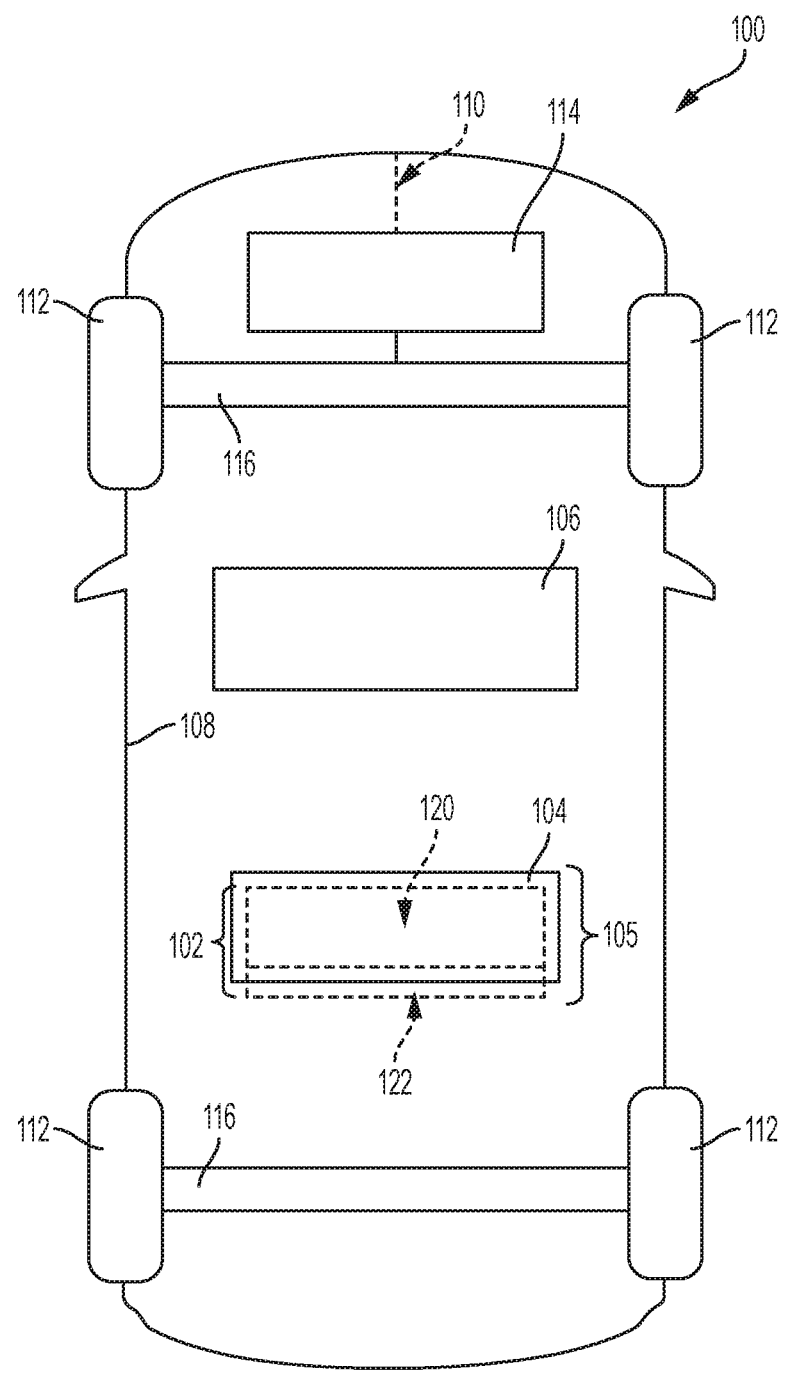
FIG. 1 is a functional block diagram of a vehicle, namely an automobile, that includes a cargo bin system for a rear occupant seat of the vehicle, that includes a bin housing and a bracket panel having a "T" shaped fastener, in accordance with exemplary embodiments.

FIG. 1 illustrates a vehicle 100 having a cargo bin system 102 for an occupant seat 104, in accordance with exemplary embodiments. As described in greater detail below, the cargo bin system 102 includes a bin housing 120 and a bracket panel 122 that includes a "T" shaped bracket component, and that can be easily and effectively installed in the vehicle 100, in accordance with exemplary embodiments. As depicted in FIG. 1, in various embodiments, the cargo bin system 102 and the occupant seat may be collectively considered as a seating system 105.

As depicted in FIG. 1, in certain embodiments, the vehicle 100 comprises an automobile. It will be appreciated that the cargo bin system 102 described herein may be implemented in any number of different types of vehicles and/or platforms. For example, in various embodiments, the vehicle 100 may comprise any number of different types of automobiles (e.g., taxi cabs, vehicle fleets, buses, sedans, wagons, trucks, sport utility vehicles, and other automobiles), other types of vehicles (e.g., marine vehicles, locomotives, aircraft, spacecraft, and other vehicles), and/or other mobile platforms, and/or components thereof.

In the depicted embodiment, the cargo bin system 102 is for a rear occupant seat 104 of the vehicle 100. In various embodiments, the rear occupant seat 104 may comprise a seating bench, one or more bucket seats, and/or one or more other types of seating configurations for occupants in one or more rear rows of seating, behind a driver and/or front occupant seats 106 of the vehicle 100. It will be appreciated that in certain embodiments cargo bin systems 102 may be installed in multiple rear occupant seats 104. It will also be appreciated that in certain other embodiments, a cargo bin system 102 may be installed in the front occupant seats 106, instead of or in addition to the rear occupant seat(s) 104.

In various embodiments, the vehicle 100 includes a body 108 that is arranged on a chassis 110. The body 108 substantially encloses other components of the vehicle 100. The body 108 and the chassis 110 may jointly form a frame. The vehicle 100 also includes a plurality of wheels 112. The wheels 112 are each rotationally coupled to the chassis 110 near a respective corner of the body 108 to facilitate movement of the vehicle 100. In one embodiment, the vehicle 100 includes four wheels 112, although this may vary in other embodiments (for example for trucks and certain other vehicles).

A drive system 114 is mounted on the chassis 110, and drives the wheels 112, for example via axles 116. The drive system 114 preferably comprises a propulsion system. In certain exemplary embodiments, the drive system 114 comprises an internal combustion engine and/or an electric motor/generator, coupled with a transmission thereof. In certain embodiments, the drive system 114 may vary, and/or two or more drive systems 114 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1 and noted above, the cargo bin system 102 includes the above-referenced bin housing 120 and bracket panel 122. As described in greater detail below in connection with FIGS. 2-8, the bracket panel 122 has a "T" shaped bracket component, and the bin housing 120 includes a mating component for receiving the "T" shaped bracket component and facilitating the easy and effective installation of the cargo bin system 102 in the vehicle 100.

Figure 2:
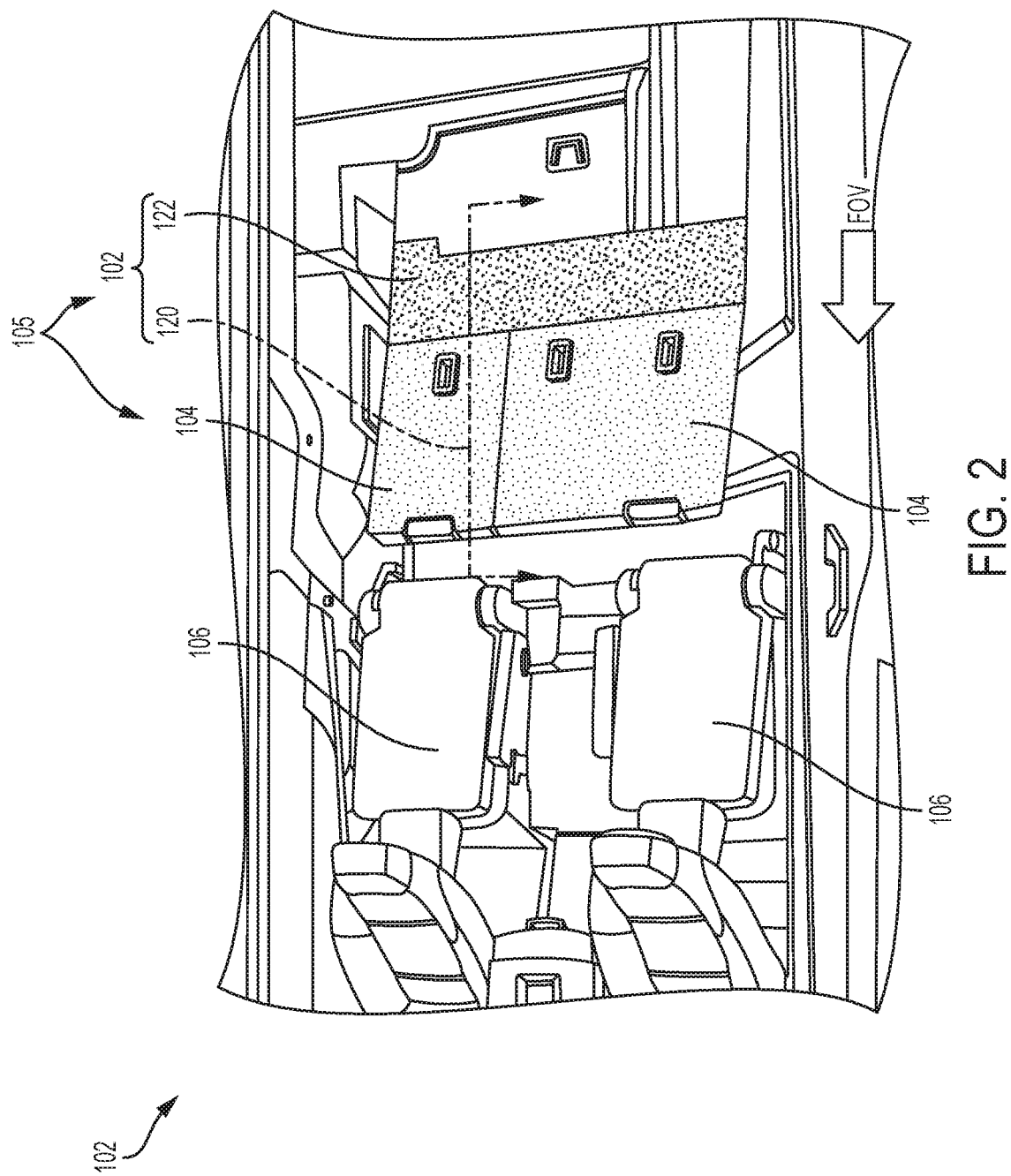
FIG. 2 provides a perspective view of the occupant seats of the vehicle of FIG. 1, including the rear occupant seat having the cargo bin system installed, in accordance with exemplary embodiments.

FIG. 2 provides a perspective view of the occupant seats 104, 106 of the vehicle 100 of FIG. 1, including the rear occupant seat 104 having the cargo bin system 102 installed, in accordance with exemplary embodiments. As depicted in FIG. 2, in various embodiments, the bracket panel 122 is installed on a lower portion of the rear occupant seat 104, behind the occupant seat 104. In various embodiments, the bracket panel 122 is coupled between the occupant seat 104 and the bin housing 120. Also in various embodiments, the bin housing 120 is attached to the bracket panel 122, and extends beneath the rear occupant seat 104.

Figure 3:
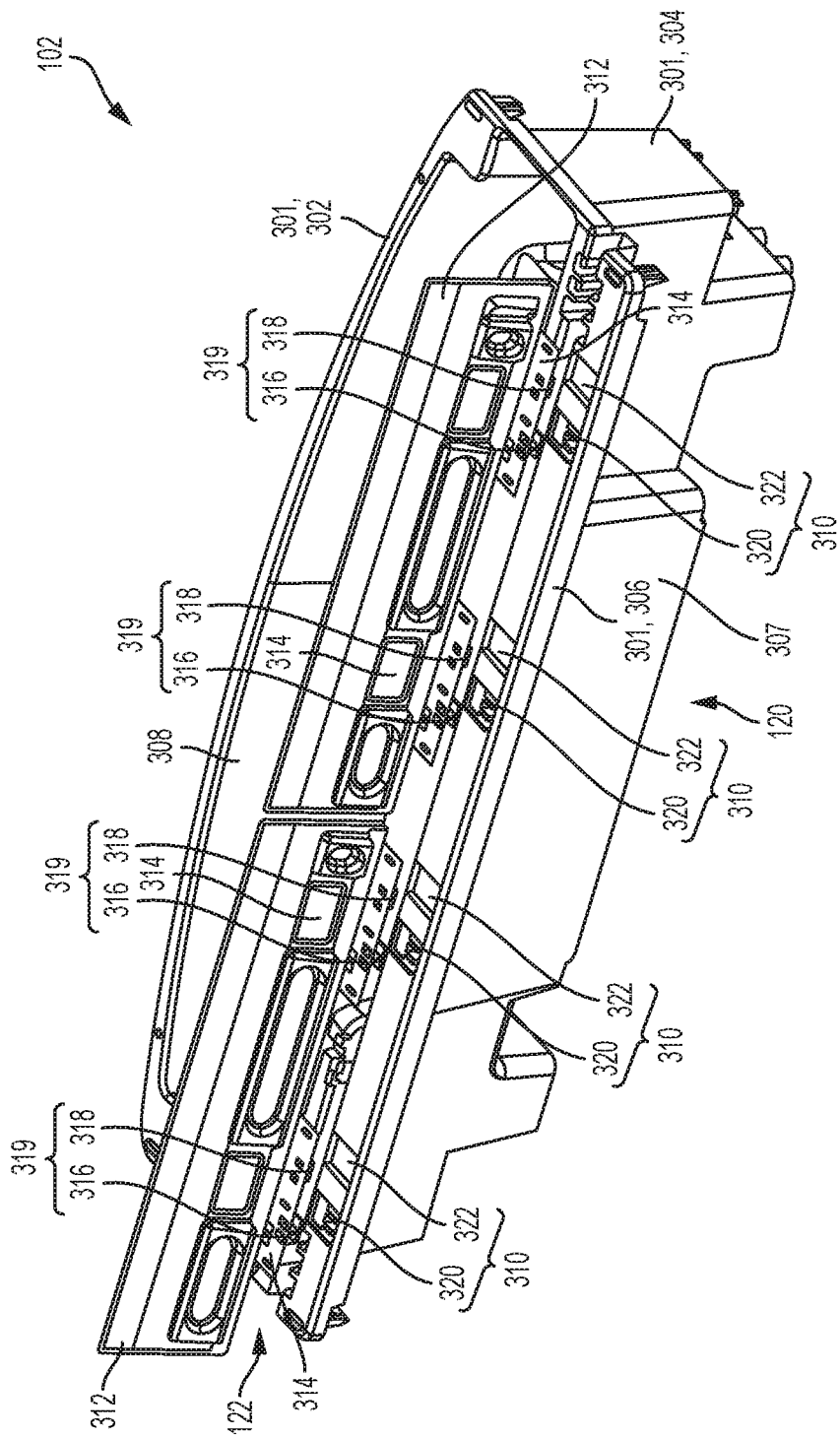
FIG. 3 is an isometric view of the cargo bin system of FIGS. 1 and 2, including the bin housing and the bracket panel, in accordance with exemplary embodiments.

With reference to FIG. 3, an exemplary cargo bin system 102 is depicted, in accordance with various embodiments. In certain embodiments, the cargo bin system 102 corresponds to the cargo bin system 102 of the vehicle 100 FIG. 1, and/or to a cargo bin system 102 of any number of other types of vehicles and/or platforms, such as those noted above with respect to the discussion accompanying FIG. 1.

As depicted in FIG. 3, in various embodiments, the bin housing 120 includes a plurality of walls 301 and mating regions 310. As depicted in FIG. 3, the plurality of walls 301 include a front wall 302, side walls 304, and a rear wall 306. In various embodiments, the front wall 302 is configured to be installed underneath a front portion of the occupant seat 104, and the rear wall 306 is configured to be installed underneath a rear portion of the occupant seat 104. Also in various embodiments, a pair of opposing side walls 304 extend between the front and rear walls 302, 306. In various embodiments, the walls 302, 304, 306 form a storage cavity 308 for storing items beneath the occupant seat 104. In various embodiments, the rear wall 306 includes an upper surface 307 in which the mating regions 310 for the bin housing 120 are formed. Also in various embodiments, the mating regions 310 are configured to mate with respective mating components 319 from the installation plate 314 of the bracket panel 122, as described below.

Also as depicted in various embodiments, the bracket panel 122 includes a plurality of mounting plates 312 along with a plurality of the above-referenced installation plates 314. In various embodiments, the mounting plates 312 and the installation plates 314 collectively form a flipper panel for the cargo bin system 102. In various embodiments, as depicted in FIG. 3, the bracket panel 122 includes two mounting plates 312 and four installation plates 314. Also as depicted in FIG. 3, in various embodiments, each mounting plate 312 is connected to two respective installation plates 314, and the mounting plates 312 and the installation plates 314 are at least in part substantially perpendicular to one another. In various embodiments, the mounting plates 312 are configured to be installed via mounting on a back surface of the occupant seat 104. Also in various embodiments, the installation plates 314 are configured to be installed as latching brackets that secures the bin housing 120 into place underneath the occupant seat 104.

As depicted in FIG. 3, in various embodiments, each installation plate 314 includes a respective mating region 319 (referenced above) that is configured to mate with a corresponding one of the mating regions 310 of the bin housing 120. Specifically, in various embodiments, the mating region 319 of each installation plate 314 includes a "T" shaped bracket 316 (e.g., a flange). In certain embodiments, the mating region 319 also includes a second protrusion 318 (e.g., a second flange). In various embodiments, both the "T" shaped bracket 316 and the second protrusion 318 extend downward from the installation plate 314 as the cargo bin system 102 would be installed under the occupant seat 104, for installing and securing the bin housing 120 underneath the occupant seat 104. Also in various embodiments, each mating region 310 of the bin housing 120 includes a first mating component 320 that is configured to receive a respective "T" shaped bracket 316 when the cargo bin system 102 is installed. In addition, in certain embodiments (e.g., in which the mating region 319 of the installation plate 314 also includes the second protrusion 318), each mating region 310 of the bin housing 120 also includes a second mating component 322 for receiving a respective second protrusion 318.

Figure 4:
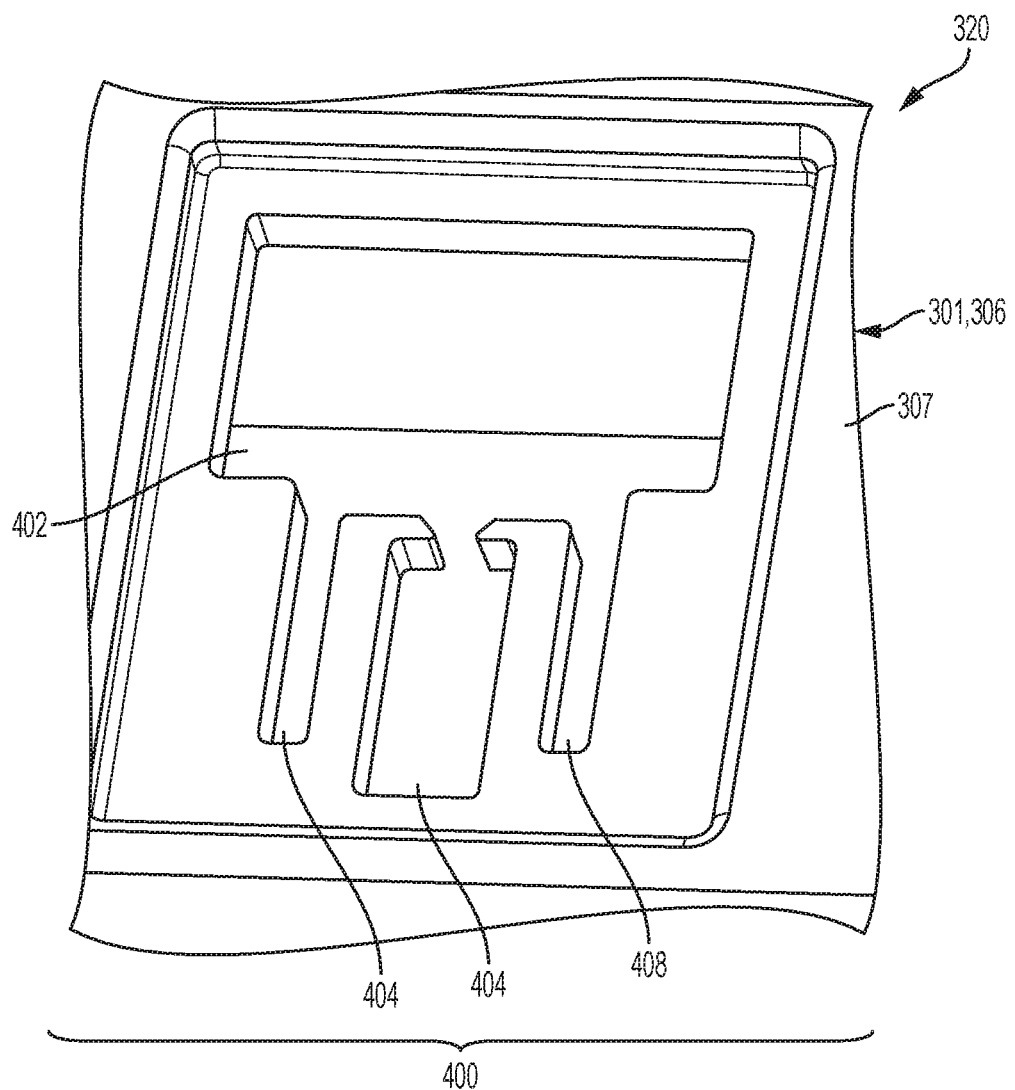
FIGS. 4-7 provide close-up views of respective mating components of the bin housing and the bracket panel of the cargo bin system of FIGS. 1-3, in accordance with exemplary embodiments.
Figure 5:
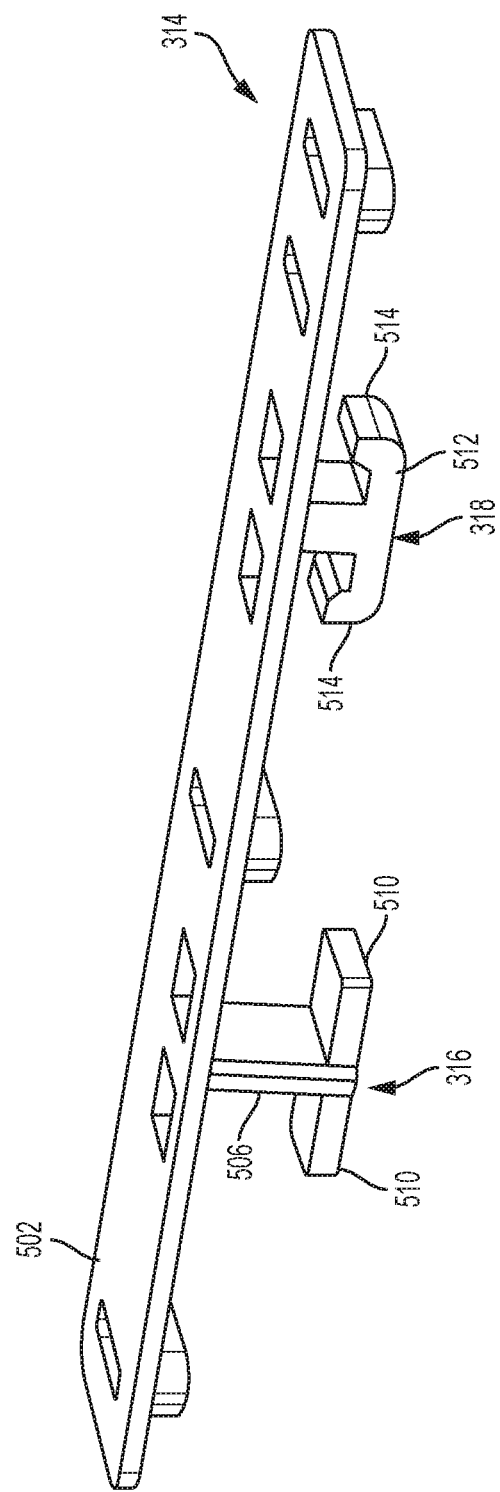
Figure 6:
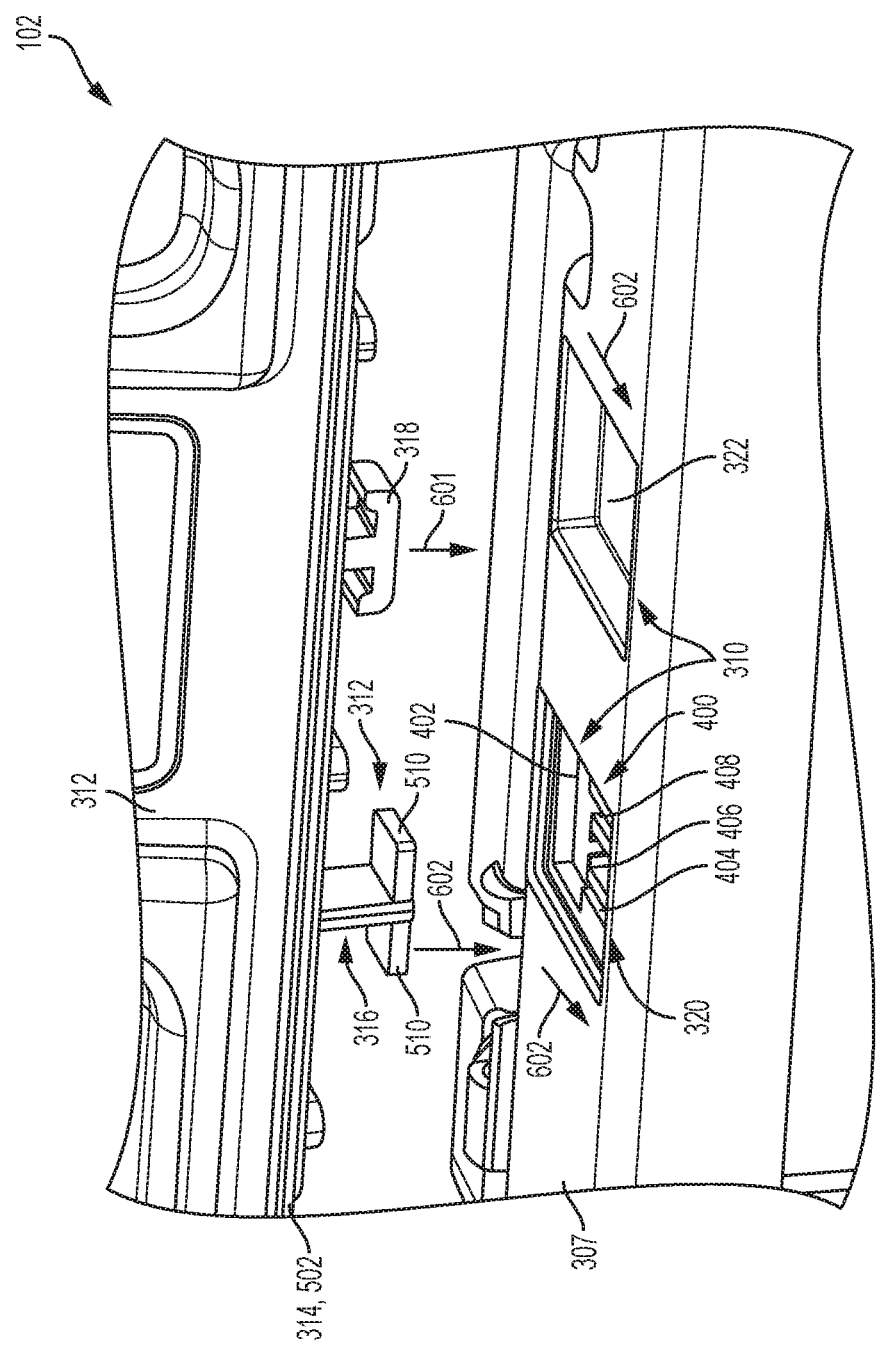
Figure 7:
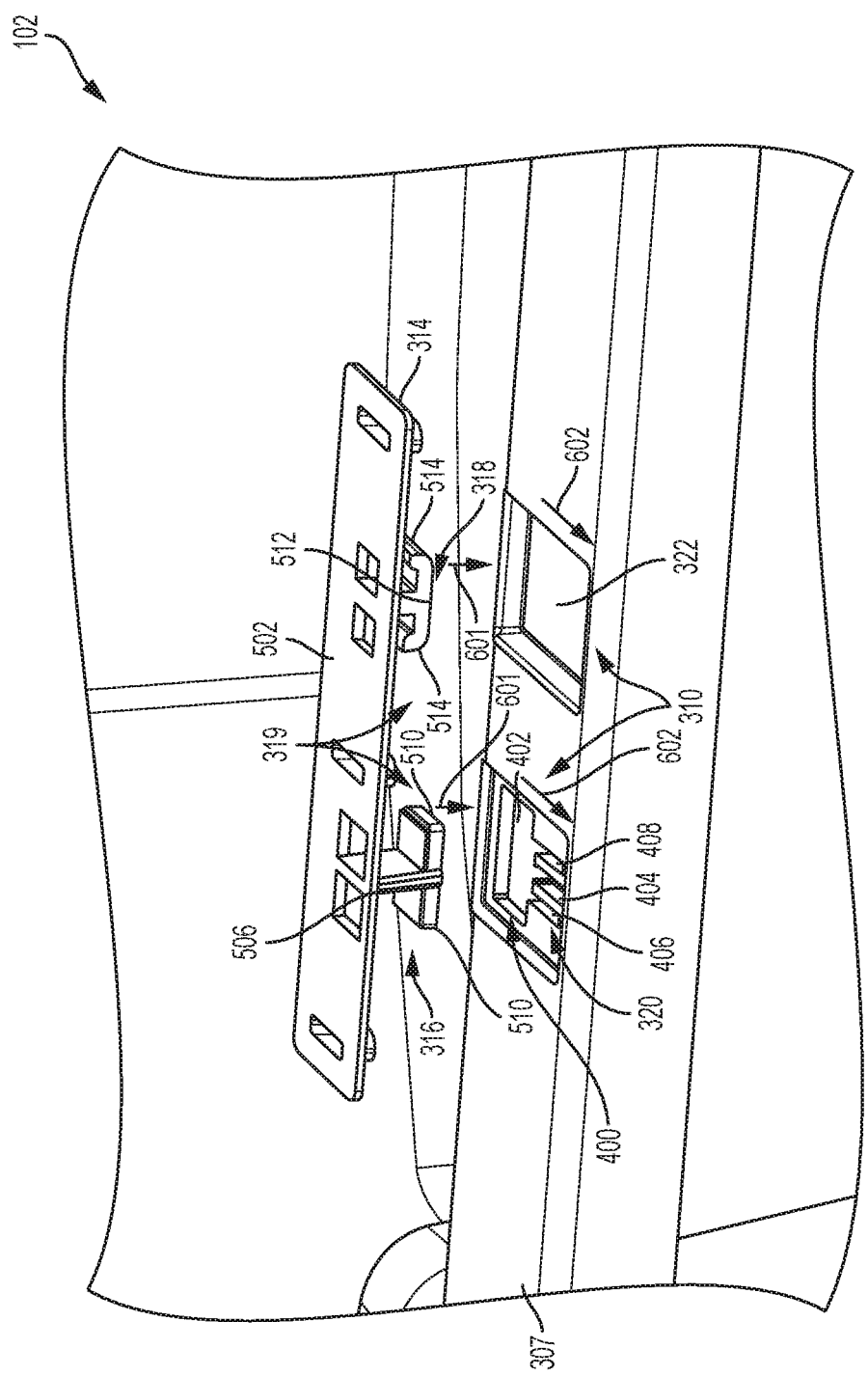

FIGS. 4-7 provide close-up views of respective mating components of the bin housing 120 and the bracket panel 122 of the cargo bin system 102 of FIGS. 1-3, in accordance with exemplary embodiments. Specifically, (i) FIG. 4 depicts a representative first mating component 320 of the bin housing 120; (ii) FIG. 5 depicts a representative installation plate 314, including the "T" shaped bracket 316 and the second protrusion 318; and (iii) FIGS. 6 and 7 depict the installation plate 314 and the bin housing 120 as they are about to be installed together via the respective mating regions 310, 319.

As depicted in FIG. 4, the first mating component 320 includes a recess 400 formed by one or more walls 301 of the bin housing 120, in accordance with various embodiments. As depicted in FIG. 4, in various embodiments, the first mating component 320 is formed within an upper surface 307 of the rear wall 306 of FIG. 3.

Also as depicted in FIG. 4, in various embodiments, the recess 400 includes multiple sections that are joined together. First, in various embodiments, the recess 400 includes a first section 402 and a second section 404, which are both configured to receive different particular sections of the "T" shaped bracket 316 of the installation plate 314 of the bracket panel 122 during different stages (or steps) of installation, for example as described in greater detail further below. As depicted in FIG. 4, in certain embodiments, the first and second sections 402, 404 are both substantially rectangular in shape, although with different orientations and magnitudes. Specifically, in certain embodiments, the first section 402 is larger in area than, and is oriented in a perpendicular direction from, the second section 404. For example, as shown in FIG. 4, in various embodiments, in the first section 402 the longer sides of the rectangle extend a first direction (i.e., left to right with respect to FIG. 4), which is perpendicular to a second direction in which the longer sides of the rectangle of the second section 404 extend (i.e., top to bottom with respect to FIG. 4).

Also in certain embodiments, the recess 400 also includes third and fourth sections 406, 408. As depicted in FIG. 4, in certain embodiments, the third and fourth sections 406, 408 have the same shape and size as one another (while being smaller in area than both the first section 402 and the second section 404), and extend from different sides of the first section 402 away from the first section 402, parallel to and on opposite sides of the second section 404, as shown in FIG. 4.

With reference to FIG. 5, in various embodiments each installation plate 314 includes a surface 502, as well as the above-referenced "T" shaped bracket 316 and second protrusion 318. As depicted in FIG. 5, in various embodiments the "T" shaped bracket 316 extends downward from the surface 502. Also in various embodiment, the "T" shaped bracket 316 is configured to be received by, and snapped into, the first mating component 320 of the bin housing 120.

As depicted in FIG. 5, in various embodiments, the "T" shaped bracket 316 includes a first component 506 and one or more second components 510. In various embodiments, the first component 506 is rectangularly shaped, and extends downward (i.e., as the installation plate 314 is installed against the occupant seat 104) from the surface 502 in a first direction that is perpendicular to the surface 502. Also in various embodiments, two second components 510 are also rectangular in shape, and extend from both sides of a bottom end of the first component 506 (i.e., an end that is away from the surface 502) in a second direction that is parallel to the surface 502 and perpendicular to the first component 506. In certain embodiments, the second component(s) 510 may be considered to be a single second component that extends from a bottom end of the first component 506 that is opposite the surface 502, in a direction that is parallel to the surface 502 and perpendicular to the first component 506.

In various embodiments, the second component 510 of the "T" shaped bracket 316 is shaped similar to the first section 402 of the recess 400 of FIG. 4, and has a length and width that are slightly less than the respective length and width of the first section 402, such that the second component 510 can readily slide vertically into the first section 402 during a first step of installation. In addition, also in various embodiments, the first component 506 of the "T" shaped bracket 316 is shaped similar to the second section 404 of the recess 400 of FIG. 1, and has a length and width that are slightly less than the respective length and width of the second section 404, such that the first component 506 can readily slide horizontally into the second section 404 during a second step of installation.

With reference to FIG. 5, in various embodiments, the second protrusion 318 includes a modified "t"-shaped design, with a relatively flat bottom surface 512 and curved ends 514 that extend on opposing sides thereof. Also in various embodiments, the second protrusion 318 is configured to be received by the second mating component 322 of the bin housing 120. In various embodiments, the second protrusion 318 slides within the second mating component 322 of FIG. 3 during installation, to help serve as a guide for the installer.

FIGS. 6 and 7 depict the installation plate 314 and the bin housing 120 as they are about to be installed together via the respective mating regions 310, 319. As labelled in FIGS. 6 and 7, during a first step of installation, the installation plate 314 moves in a first direction 601 toward the upper surface 307 of the bin housing 120. In certain embodiments, the installation plate 314 moves in the first direction 601 downward to contact the upper surface 307. Accordingly, in various embodiments, the "T" shaped bracket 316 slides downward into the first section 402 of the recess 400 of the first mating component 320 in the first direction 601 as the second component 510 of the "T" shaped bracket 316 is received by the first section 402 of the recess 400. Simultaneously, in various embodiments, the section protrusion 318 moves downward into the second mating component 322 as it is received thereby.

Also in various embodiments, during a second step of installation (subsequent to the first step), the installation plate 314 moves in a second direction 602 (perpendicular to the first direction 601) along the upper surface 307 of the bin housing 120. In certain embodiments, the installation plate 314 moves in the second direction 602 laterally upon contacting the upper surface 307. In various embodiments, the "T" shaped bracket 316 slides laterally within the recess 400 such that the first component 506 of the "T" shaped bracket 316 slides laterally into the second section 404 of the recess 400 of the first mating component 320 in the second direction 602 as the first component 506 of the "T" shaped bracket 316 is received by the second section 404 of the recess 400. Simultaneously, in various embodiments, the section protrusion 318 moves laterally within the second mating component 322 in the second direction 602. In various embodiments, upon completion of the second step of installation, the "T" shaped bracket 316 is snapped into the first mating component 320 of the bin housing 120, with the first component 506 remaining within the second section 404 of the recess 400 and the second component 510 remaining within the recess 400 underneath the first, second, and third sections 404, 406, and 408 thereof.

Figure 8:
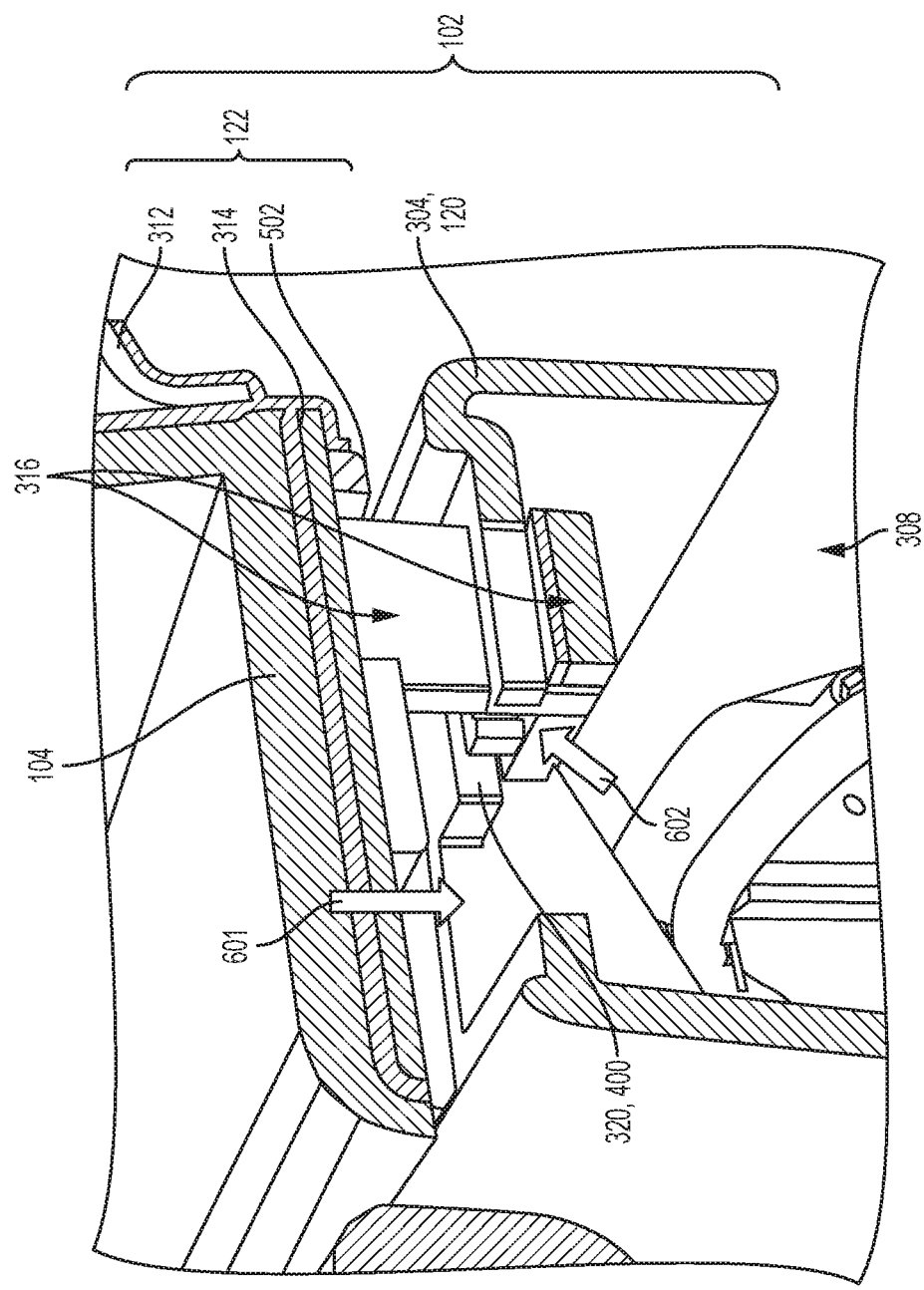
FIG. 8 depicts the cargo bin system of FIGS. 1-7 as installed in the occupant seat of FIGS. 1 and 2, in accordance with exemplary embodiments.

FIG. 8 depicts the cargo bin system 102 of FIGS. 1-7 as installed in the occupant seat 104 of FIGS. 1 and 2, in accordance with exemplary embodiments. Specifically, as shown in FIG. 8, the cargo bin system 102 is installed behind and underneath the occupant seat 104. Also as depicted in FIG. 9, the "T" bracket 316 is shown as snapped into the first mating component 320 of the bin housing 120 underneath the occupant seat 104, after being installed (i) first in the first direction 601 and (ii) subsequently in the second direction 602 into the recess 400. Also as depicted in FIG. 4, in various embodiments, the mounting plate 312 is installed behind the occupant seat 104, and the storage cavity 308 is accessible under the occupant seat 104.

Accordingly, the systems and vehicles described herein provide for a cargo bin system that includes a bin housing as well as a bracket panel. The bracket panel has a "T" shaped bracket with multiple components extending in different directions for insertion into the bin housing. The bin housing includes a mating region having a recess with multiple sections for receiving the "T" shaped bracket. During the installation, the "T" shaped bracket is first inserted downward into a first section of the recess, and is then moved laterally into a section of the recess as it is snapped into place. In various embodiments, the disclosed cargo bin system with the "T" shaped bracket can provide for potentially improved retention as the occupant seat moves, for example in the case of sudden braking or other vehicle events.

It will be appreciated that the systems and vehicles may vary from those depicted in the Figures and described herein. It will similarly be appreciated that the seating system, and components and implementations thereof, may be installed in any number of different types of platforms (including those discussed above), and vary from that depicted in FIGS. 1-8 and described in connection therewith, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A seating system for a vehicle, the seating system comprising:
   an occupant seat;
   a bin housing forming a cavity in which items may be stored beneath the occupant seat, the bin housing including a bin surface forming a recess having a first section and a second section; and
   a bracket panel coupled between the occupant seat and the bin housing, the bracket panel including:
   an installation plate having a panel surface; and a "T" shaped bracket extending from the panel surface, the "T" shaped bracket configured to be inserted into the first section and the second section of the recess during installation, wherein the "T" shaped bracket includes:
- a first component configured to be received by the second section of the recess during installation; and
- a second component configured to be received by the first section of the recess during installation.

2. The seating system of claim 1, wherein the first component of the "T" shaped bracket, the second component of the "T" shaped bracket, the first section of the recess, and the second section of the recess are each at least substantially rectangular in shape, with each having respective opposing larger sides and respective opposing smaller sides.

3. The seating system of claim 2, wherein:
the first component extends, parallel to the panel surface, from an end of the first second component that is opposite the panel surface;
the first section of the recess is configured with its respective larger sides extending in a first direction; and
the second section of the recess is configured with its respective larger sides extending in a second direction that is perpendicular to the first direction.

4. The seating system of claim 1, wherein:
the first component of the "T" shaped bracket is configured to be received by the second section of the recess during a first installation step, in which the "T" shaped bracket is moved in a first direction toward the bin surface; and
the second component of the "T" shaped bracket is configured to be received by the first section of the recess during a second installation step, subsequent to the first installation step, in which the "T" shaped bracket is moved in a second direction along the bin surface.

5. The seating system of claim 4, wherein the "T" shaped bracket is configured to be snapped into place within the recess during the second installation step.

6. The seating system of claim 1, wherein:
the bracket panel further includes a second protrusion extending from the panel surface; and
the bin surface further forms a mating region configured to receive the second protrusion during installation.

7. The seating system of claim 1, wherein the bracket panel further includes a mounting plate that is configured to be attached to the installation plate and mounted to the occupant seat of the vehicle.

8. The seating system of claim 7, wherein the vehicle comprises an automotive vehicle.

9. A vehicle comprising:
a body;
a propulsion system configured to move the body; and
a seating system disposed within the body, the seating system comprising:
an occupant seat;
a bin housing forming a cavity in which items may be stored beneath the occupant seat, the bin housing including a bin surface forming a recess having a first section and a second section; and
a bracket panel coupled between the occupant seat and the bin housing, the bracket panel including:
an installation plate having a panel surface; and
a "T" shaped bracket extending from the panel surface, the "T" shaped bracket configured to be inserted into the first section and the second section of the recess during installation, wherein the "T" shaped bracket includes:
a first component configured to be received by the second section of the recess during installation; and
a second component configured to be received by the first section of the recess during installation.

10. The vehicle of claim 9, wherein:
the first component of the "T" shaped bracket is configured to be received by the second section of the recess during a first installation step, in which the "T" shaped bracket is moved in a first direction toward the bin surface; and
the second component of the "T" shaped bracket is configured to be received by the first section of the recess during a second installation step, subsequent to the first installation step, in which the "T" shaped bracket is moved in a second direction along the bin surface.

11. The vehicle of claim 10, wherein the "T" shaped bracket is configured to be snapped into place within the recess during the second installation step.

12. The vehicle of claim 11, wherein the vehicle comprises an automotive vehicle.

* * * * *